United States Patent [19]

Grossmann

[11] Patent Number: 5,765,456
[45] Date of Patent: Jun. 16, 1998

[54] PROCESS FOR THE MACHINING OF A WORKPIECE ON A CNC AUTOMATIC LATHE AS WELL AS A CNC AUTOMATIC LATHE

[75] Inventor: Walter Grossmann, Baltmannsweiler, Germany

[73] Assignee: Index-Werke GmbH & Co. Hahn & Tessky, Esslingen, Germany

[21] Appl. No.: 882,478

[22] Filed: Jun. 25, 1997

Related U.S. Application Data

[63] Continuation of Ser. No. 610,594, Mar. 7, 1996, abandoned, which is a continuation of PCT/EP94/02710 Aug. 13, 1994.

[30] Foreign Application Priority Data

Sep. 11, 1993 [DE] Germany .................. 43 30 858.9

[51] Int. Cl.⁶ .................................................. B23B 7/04
[52] U.S. Cl. ..................... 82/1.11; 29/27 C; 29/36; 29/40; 29/27 R; 82/120; 82/121
[58] Field of Search ................... 82/1.11, 120, 121; 29/27 R, 27 A, 27 C, 40, 53, 36, 39; 409/240

[56] References Cited

U.S. PATENT DOCUMENTS

| | | |
|---|---|---|
| Re. 33,732 | 11/1991 | Link . |
| Re. 34,155 | 1/1993 | Link . |
| 4,571,796 | 2/1986 | Sellnez et al. ............ 29/27 R |
| 4,635,340 | 1/1987 | Link . |
| 4,683,626 | 8/1987 | Steiner ....................... 29/40 |
| 4,683,787 | 8/1987 | Link . |
| 5,214,829 | 6/1993 | Minagawa ................. 29/27 C |
| 5,343,604 | 9/1994 | Takagi ....................... 82/121 |
| 5,490,307 | 2/1996 | Link .......................... 29/40 |

FOREIGN PATENT DOCUMENTS

| | | |
|---|---|---|
| 0538515 | 4/1993 | European Pat. Off. . |
| 4105768 | 8/1992 | Germany . |
| 3328327 | 3/1995 | Germany . |
| 93/07981 | 4/1993 | WIPO . |

*Primary Examiner*—Steven N. Bishop
*Attorney, Agent, or Firm*—Edward J. Timmer

[57] ABSTRACT

A CNC automatic lathe has at least one carriage system having an X, a Y, and a Z axis that carries a tool revolver designed as a so-called disk revolver for working with lathe tools and rotary machining tools. In order to reduce as much as possible the distance between a defined cutting plane for the turning process and the carriage system, the Y axis forms with the normal to the cutting plane a relatively small acute angle (beta), so that when the tool revolver is rotated in a controlled manner around its axis, a rotatively driven machining tool mounted on the revolver and located in its working position is swivelled with its axis of rotation through an acute angle out of the cutting plane in the direction of the carriage system. The machining area of the machining tool thus described a movement with a component that extends in the minus direction of the Y axis.

12 Claims, 8 Drawing Sheets

5,765,456

PROCESS FOR THE MACHINING OF A WORKPIECE ON A CNC AUTOMATIC LATHE AS WELL AS A CNC AUTOMATIC LATHE

This application is a continuation of U.S. Ser. No. 08/610,594 filed Mar. 7, 1996, now abandoned, which is a Continuation of International Application No. PCT/EP94/02710, filed Aug. 13, 1994.

BACKGROUND OF THE INVENTION

The invention relates to a process for the machining of a workpiece by means of a rotatively drivable machining tool on a CNC automatic lathe.

The invention also relates to a CNC automatic lathe. Lathes of this type are designed all the more frequently as lathe machining centers which can, apart from the pure lathe machining of the rotating workpiece with a stationary tool, also carry out machining operations with a rotating tool, during which the workpiece is rotated either not at all or slowly. Typical machining operations of this type with the aid of a rotating tool are milling, boring, grinding and the like, with which the workpiece contours to be produced can also be oriented in the most varied of ways so that, for example, a bore not extending radially to the axis of rotation of the workpiece can be produced.

To simplify the following explanations and the formulation of the attached claims, several terms will first of all be defined in the manner customary for lathes:

Z-axis=direction of the workpiece spindle axis (the positive direction of the Z-axis is the direction pointing away from the workpiece spindle);

X-axis=feed direction of a lathe tool in radial direction with respect to the workpiece spindle axis (the positive direction of the X-axis points away from the workpiece spindle axis);

Cutting plane=plane defined by the Z-axis and X-axis and containing the workpiece spindle axis;

Y-axis feed=direction of a tool located in a plane extending at right angles to the Z-axis, this feed direction being transverse and, in particular, exactly at right angles to the cutting plane (the positive direction of the Y-axis points from a carriage system holding the tool towards the cutting plane);

Linear axis=direction, in which a machine component is displaceable in a controlled manner and with measurement of the distance travelled or continuous detection of the momentary position (the X-axis, Y-axis and Z-axis are such linear axes);

Rotatory axis=axis, about which a machine component is rotatable in a controlled manner and with continuous detection of the momentary angle of rotation position;

C-axis=rotatory axis of the workpiece spindle extending in the direction of the Z-axis;

B-axis=rotatory axis of the workpiece carrier extending in the direction of the Y-axis.

For simple milling and boring operations and the like it may be sufficient for the workpiece spindle holding the workpiece to be provided with a brake or the like for securing the workpiece spindle; depending on the complexity of the workpieces, the automatic lathe does, however, require, apart from an X-axis and a Z-axis, a Y-axis and/or a B-axis and/or a C-axis.

With such lathes, the various tools—stationary tools for the lathe machining and tools rotating on account of a corresponding drive for the boring, milling and the like—are generally arranged on a tool carrier in the form of a so-called tool turret, and the form of such a tool turret most used nowadays is the so-called disk turret which, to enable each tool to be moved into an operating position, can be turned in a controlled manner about a turret axis extending parallel to the workpiece spindle axis, at least in a lathe without a B-axis or in a lathe with a B-axis in the starting position of the tool turret, in which no use has yet been made of the B-axis.

A Z-axis may be realized in that the headstock of the lathe holding the workpiece spindle is displaceable in the direction of the Z-axis and/or that a carriage system holding the tool carrier comprises a carriage displaceable in the direction of the Z-axis; the latter is preferred for reasons of stability and with a view to as simple a machine construction as possible.

With known automatic lathes of the type described, half of the travel path of a tool which is available for the machining and extends in the direction of the Y-axis is located on each side of the cutting plane so that a workpiece—when seen in the direction of the workpiece spindle axis and in relation to the cutting plane—can be machined off-center with respect to the cutting plane in both directions with an equal maximum distance. This does, however, require a relatively large distance of the cutting plane from the machine bed or the carriage bed holding and guiding one or several carriages for carrying the tool carrier. This carriage bed is part of the machine bed and this distance is, for example, 50% of the maximum possible travel path of a machining tool or of the tool turret in the direction of the Y-axis in order to allow an adequate displacement of the tool or the tool turret in a negative direction of the Y-axis, i.e. in the direction towards the machine bed or the carriage bed. Such a relatively large distance does, however, lead to a reduction in the rigidity of the machine construction since it requires not only a relatively large distance of a working lathe tool from the machine bed or carriage bed but also a relatively large distance of the working spindle from the machine bed or carriage bed. This means that the machining precision will be impaired and the maximum cutting capacity available during turning is reduced, at least in lathes, with which the relative movements between workpiece to be machined and operating tool in the direction of the X-axis and the Y-axis are carried out by the tool carrier, a circumstance which is unavoidable in all lathes which have a so-called tailstock, a backrest and/or a bar stock supply device, by means of which bar-shaped raw material is supplied to the workpiece spindle in the direction of the workpiece spindle axis for the production of the workpieces.

The invention now deals with a process for the machining of a workpiece by means of a rotatively drivable machining tool on a CNC automatic lathe as well as such an automatic lathe which has a headstock, in which a workpiece spindle for holding a workpiece to be machined is mounted for rotation about a workpiece spindle axis, a workpiece spindle drive enabling the workpiece spindle to be secured and a stationary carriage bed, on which at least one tool carrier carriage system is held which comprises a carriage displaceable not only in the direction of the X-axis but also in the direction of the Y-axis and bearing a tool carrier in the form of a tool turret having a plurality of tool stations, the tool turret being rotatable in a controlled manner about a turret axis parallel to the Z-axis as well as securable in a plurality of angle of rotation positions and at least one of its tool stations being equippable with a rotatively drivable machining tool which is oriented at right angles to the turret axis and can be brought into a working position by rotation of the tool turret, wherein workpiece spindle and tool turret are displaceable relative to one another in the direction of the Z-axis.

An automatic lathe of this type is known from DE-41 05 768-A1. This is a machine with an inclined bed, an upper tool carrier designed as a tool turret on an upper cross slide system which comprises a Z carriage as lower or bed carriage and an X carriage as upper carriage, and a lower tool carrier which is likewise designed as a tool turret and is arranged on a carriage system which comprises a Z carriage as bed or lower carriage, a Y carriage borne by the latter and an X carriage guided on the Y carriage and bearing the tool turret. For the lower tool turret, the cutting plane defined by the workpiece spindle axis and the direction of the X-axis extends horizontally, i.e. inclined in relation to the upper side of the inclined bed, whereas the Y-axis extends parallel to the upper side of the inclined bed and, consequently, the direction of the Y-axis extending through the turret axis forms with the normal through the turret axis onto the cutting plane an angle β which is located on the side of this normal facing the workpiece spindle axis.

This known machine construction results in the following disadvantages: The Y carriage associated with the lower tool turret must, of necessity, have a large working area which has a disadvantageous effect on the rigidity of the machine and, therefore, on the precision of the workpieces produced with it. Furthermore, the lower tool turret—with respect to the workpiece spindle—cannot be located diagonally opposite to the upper tool turret, for which reason the transverse forces which can press the workpiece out of the axis of rotation cannot cancel one another out during a 4-axis lathe machining. Finally, a feeding movement in the direction of the classic Y-axis (at right angles to the cutting plane) always requires simultaneous feeding movements of the Y carriage as well as the X carriage which are correlated with one another; movements resulting from two correlated axis movements are, however, always less exact (namely in the form of steps) in an NC or CNC machine than purely linear movements. The known construction principle also makes it appear impossible to associate a B-axis (controlled rotational movement about the Y-axis) with the lower tool turret.

SUMMARY OF THE INVENTION

The object underlying the invention, in a process for the machining of a workpiece by means of a rotatively drivable machining tool on a CNC automatic lathe of the type defined in the above, which makes a displacement of this machining tool in the direction of the Y-axis necessary, is to at least not have to effect the entire path of displacement in the direction of the Y-axis due to a displacement of a carriage bearing the tool turret in the direction of the Y-axis. This may be accomplished in accordance with the invention in that prior to work being done with the rotatively drivable machining tool the tool turret is rotated about the turret axis in such a manner that the axis of rotation of the machining tool facing the workpiece forms an acute angle with a plane parallel to the cutting plane and extending through the turret axis, this acute angle being located on the side of this plane facing the carriage bed, whereupon for the workpiece machining the tool turret is displaced with rotating machining tool and unchanged alignment of the tool axis of rotation in a direction of movement which has at least one movement component extending at right angles to the Z-axis and at right angles or parallel to the tool axis of rotation, and thereby acts on the workpiece with its machining tool.

Such a machining process first of all allows work to be done, for example during the production of an off-center bore, on an automatic lathe, the tool turret of which does not have a classic Y-axis available. However, when such a Y-axis is present, workpieces can be produced with greater precision, as will result from the following. Moreover, a reduction in the idle periods, during which no machining is effected, can, if necessary, be achieved since the tool turret can already be adjusted such that the tool axis forms the specified angle with the cutting plane when it is indexed about the turret axis in order to apply the rotatively drivable machining tool which is later to be used to the workpiece to be machined.

If the inventive machining process is carried out on an automatic lathe, the tool turret of which has a true Y-axis available, an interpolation procedure in the machine control, as described in the above, can be dispensed with when the tool turret is rotated about the turret axis in such a manner that the tool axis of rotation extends at right angles to the Y-axis, whereupon for the workpiece machining the tool turret is displaced in the direction of the Y-axis or at right angles hereto in order to, for example, mill a surface parallel to the workpiece axis or produce a bore oriented at right angles to the workpiece axis.

A further object underlying the invention is to design a CNC automatic lathe of the type defined in the above, with which the direction of the Y-axis extending through the turret axis forms an acute angle β with the normal through the turret axis onto the cutting plane defined by the workpiece spindle axis and the X-axis, this acute angle β being greater than 0° and at the most 45°, such that it allows a more precise workpiece machining, despite the presence of a Y-axis, than known automatic lathes of this type with a Y-axis, i.e. that the rigidity of the machine construction is at least not appreciably less than in automatic lathes of this type without a Y-axis.

This object is accomplished in accordance with the invention in that the construction is designed such that the angle β is located on the side of the specified normal facing away from the workpiece spindle axis and that due to controlled rotation of the tool turret about the turret axis a rotatively drivable machining tool borne by the tool turret and located in a working position can be swivelled with its axis of rotation out of the cutting plane through an acute angle γ in the direction towards the carriage system such that the operative machining area of this tool thereby carries out a movement which has a movement component extending in a minus direction of the Y-axis.

When it is stated in the above that the turret axis extends parallel to the Z-axis, this applies, of course, only to automatic lathes without a B-axis or in machines with a B-axis only for the starting position of the tool turret, in which the tool turret has not yet been swivelled about the B-axis.

An inventive machine construction first of all allows, e.g. during milling, at least part of the negative Y path (the path of displacement of the rotating machining tool located on the side of the cutting plane facing the carriage bed) to be covered due to rotation of the tool turret about its turret axis which, in comparison with known automatic lathes with a Y-axis, enables the workpiece spindle to be arranged at a smaller distance from the machine bed or carriage bed and the distance of a working lathe tool from the machine bed or carriage bed to be reduced (measured each time at right angles to the cutting plane).

Furthermore, the swivelling of the Y-axis in relation to the normal onto the cutting plane results in more space being available for those parts of the carriage system bearing the tool turret which are located between the carriage bed and the Y carriage (when seen in the direction of the Z-axis at right angles to the side of the carriage bed holding the carriage system), in particular for a bed carriage guided on the carriage bed for displacement in the direction of the Z-axis.

As will result from the following, the basic concept of the invention can also be defined in such a way that the tool feed directions (cutting directions) can be selected differently for lathe tools and for rotating machining tools—for turning these are a direction radial in relation to the workpiece spindle axis and the direction of the workpiece spindle axis, these two directions defining the cutting plane, in which the workpiece spindle axis is located; for machining with a rotating tool these are a feed direction inclined in relation to the cutting plane and operative in the sense of a reduction in the workpiece diameter, a feed direction extending at right angles to the latter and to the workpiece spindle axis and a feed direction parallel to the workpiece spindle axis. The different feed directions for lathe tools or rotating machining tools result from the different angular positions of the tool turret, in which a lathe tool or a rotating machining tool is used, the feed direction of a rotating machining tool operative in the sense of a reduction in the workpiece diameter resulting from the feed direction of a lathe tool operative in the same sense due to rotation of the tool turret about the turret axis, namely in the sense of the operative machining area of a rotating machining tool approaching the machine bed or carriage bed (measured in the direction at right angles to the cutting plane defined for a lathe operation).

When it is stated in the above that a rotatively drivable machining tool located in a working position is swivelled with its axis of rotation out of the cutting plane in the direction towards the carriage system, in this case the working position of the rotatively drivable machining tool is not to be understood as that angle of rotation position, in which the rotating machining tool actually operates, but the angle of rotation position of a working lathe tool replacing the rotatively drivable machining tool.

In preferred embodiments of the inventive automatic lathe, the angle β is relatively small and is approximately 10° to approximately 30° since such an angle is, normally, completely adequate for achieving the advantages mentioned in the above. Particularly preferred are embodiments, in which the angle β is smaller than the angle of rotation distance between two adjacent tool stations of the tool turret which is, for example, 30°0 in a tool turret having twelve tool stations; a measurement of the angle β such that it is approximately ⅔ of this angle of rotation distance in a tool turret having twelve tool stations is particularly recommended.

If the angle γ, about which the axis of rotation of a rotatively drivable machining tool is swivelled out of the cutting plane, deviates from the angle of inclination β of the Y-axis, i.e. from the angle of inclination of the direction of guidance of the Y carriage in comparison with the normal onto the cutting plane defined for a lathe tool, both the X carriage and the Y carriage must be displaced simultaneously in a manner coordinated with one another during work with a rotating machining tool if this is intended to be displaced in a direction at right angles to its axis of rotation and at right angles to the Z-axis. In a CNC automatic lathe, this can be accomplished by interpolation within the computerized numerical control. However, embodiments are particularly preferred, in which the angles β and γ are of an equal size since it is then sufficient for the machining operation as described to displace only the Y carriage; an interpolation procedure can then be omitted, and surfaces of a better quality result, for example, during milling. If, on the other hand, a machining operation requires a tool feed in the direction of the tool axis, as is, for example, necessary during boring, the X carriage and the Y carriage must also carry out movements coordinated with one another when the angles β and γ are of the same size.

To enable surfaces, bores or the like which are inclined with respect to the workpiece spindle axis to also be produced with an inventive automatic lathe using a rotating tool, it is recommended that the automatic lathe be provided with a B-axis which may be realized in the simplest way by a shaft which is rotatable about its longitudinal axis and bears the tool turret being mounted on the Y carriage. In this case, the construction must be designed such that the axis of rotation of a working, rotating machining tool is oriented at right angles to the direction of guidance of the Y carriage.

In the following, the invention and its advantages will be explained in even greater detail, namely on the basis of the attached drawings of two particularly advantageous embodiments of the inventive automatic lathe; in the drawings:

DESCRIPTION OF THE INVENTION

Figure 1:
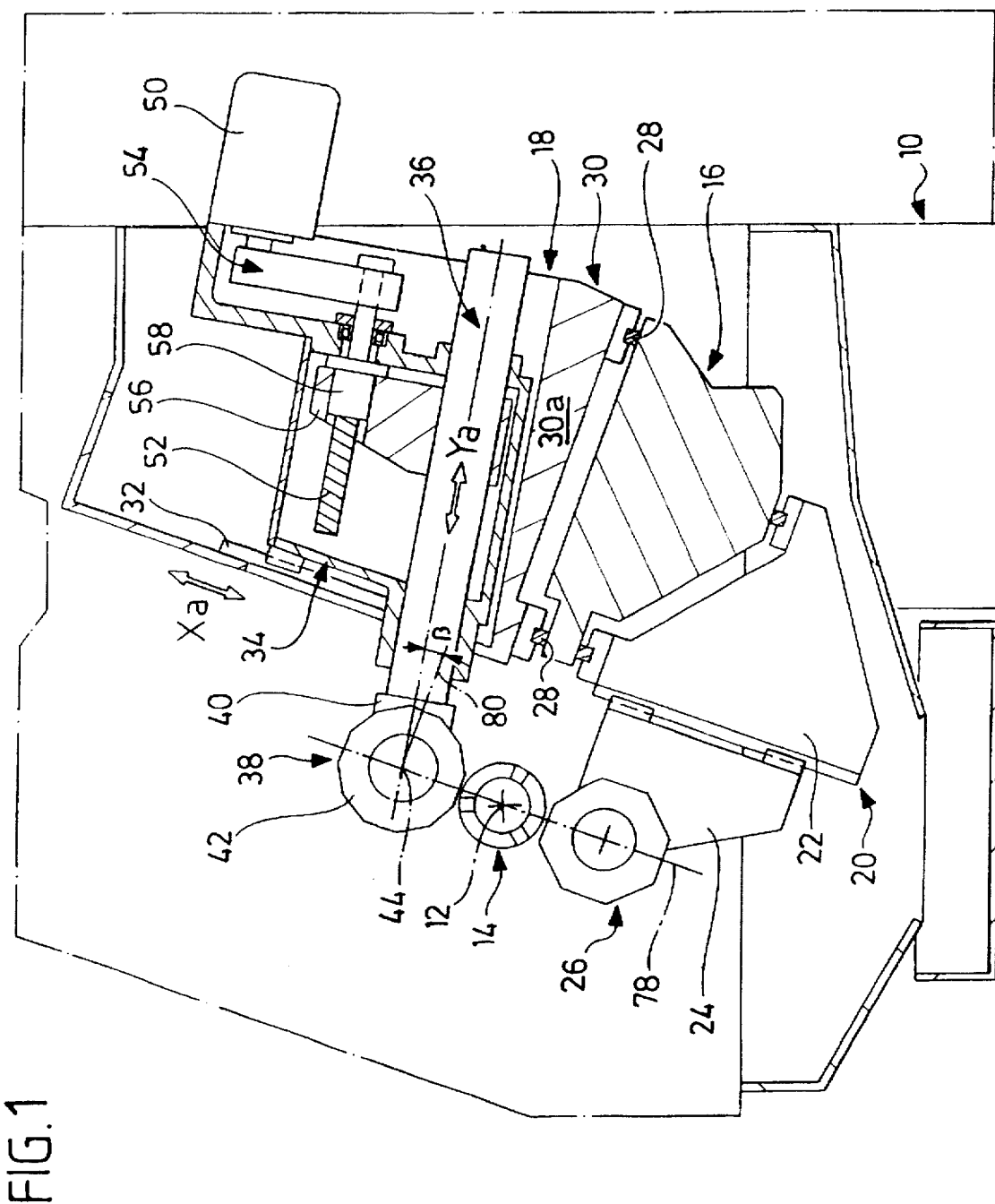
FIG. 1 shows a considerably simplified front view of the first embodiment of this automatic lathe, seen in the direction of the Z-axis or workpiece spindle axis, with the X carriage of the carriage system bearing the upper tool turret cut away to show the Y-axis drive for the Y carriage.

FIG. 1 shows a machine frame 10 bearing a headstock 100 which is not illustrated in FIG. 1 and only indicated in FIG.

9 for the second embodiment and in which a workpiece spindle 102 (cf. FIG. 9) with an axis at right angles to the plane of drawing in FIG. 1 is mounted for rotation about this axis;

FIG. 1 shows the workpiece spindle axis 12 and a chuck 14 attached to the end of the workpiece spindle facing the observer for holding a workpiece to be machined such that it rotates about the workpiece spindle axis 12 when the workpiece spindle is driven.

As already mentioned, the direction of the workpiece spindle axis 12 defines the direction of the Z-axis which, consequently, is likewise oriented at right angles to the plane of drawing in FIG. 1.

A carriage bed 16 is attached to the machine frame 10. Its cross-sectional form is reproduced in FIG. 1 and it extends in the direction of the Z-axis. The upper side of the carriage bed 16 bears an upper carriage system 18, and a lower carriage system 20 which is, however, not the subject matter of the present invention is suspended from the underside of the carriage bed. It is merely to be pointed out in brief that the lower carriage system 20 comprises a Z or bed carriage 22 guided on the carriage bed 16 for displacement in the direction of the Z-axis and an X carriage 24 guided on the bed carriage for displacement in the direction of the X-axis indicated in FIG. 1 by the double-headed arrow $X_a$. A lower tool turret 26 is attached to this X carriage.

Insofar as the automatic lathe has so far been described, it is identical to known automatic lathes of this type and so it is also not necessary to go into detail concerning the parts already described.

The upper carriage system 18 has a Z or bed carriage 30 which is held on the carriage bed 16 with the aid of known linear guide means 28 and is guided for displacement in the direction of the Z-axis. Its base member 30a has, in accordance with the invention, an approximately wedge-shaped cross section so that it has a greater constructional height with increasing distance from the workpiece spindle axis 12. Linear guide means 32 extending in the direction of the $X_a$-axis are attached to this Z carriage and with their help an X carriage 34 is held and guided on the Z carriage 30 for displacement in the direction of this $X_a$-axis. This X carriage 34 forms a guide means for a Y carriage 36 designed as a so-called spindle sleeve and so this is guided on the X carriage for displacement in the direction of the $Y_a$-axis indicated by a double-headed arrow.

Figure 2:
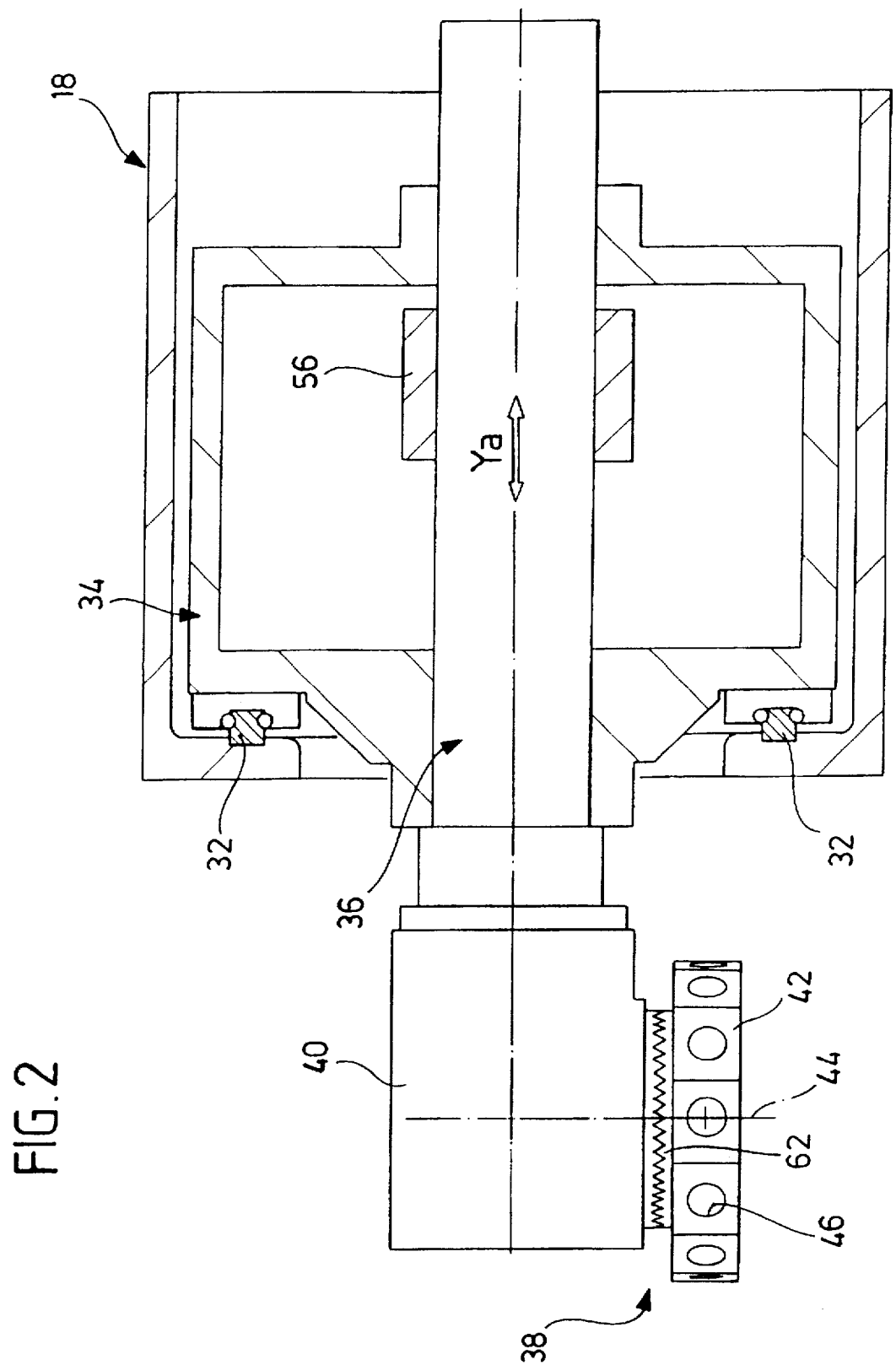
FIG. 2 shows a plan view of the upper carriage system, again with the X carriage cut away, seen in the direction of the double-headed arrow $X_a$ from FIG. 1, namely together with an upper tool turret.
Figure 3:
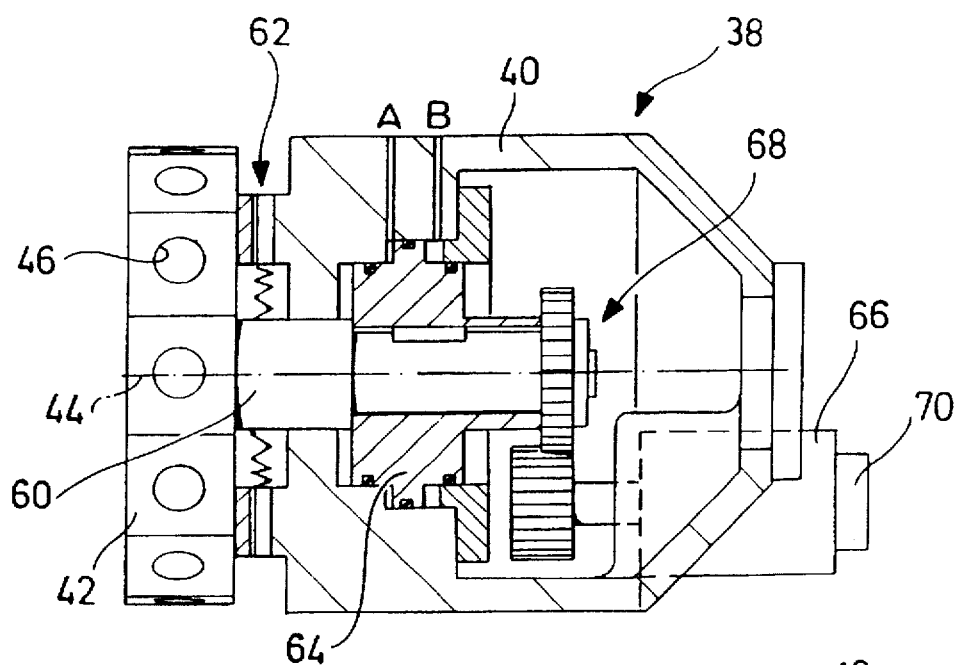
FIG. 3 shows the upper tool turret with the turret body bearing the turret head cut away to be able to show the drive device turning the turret head about the turret axis.
Figure 4:
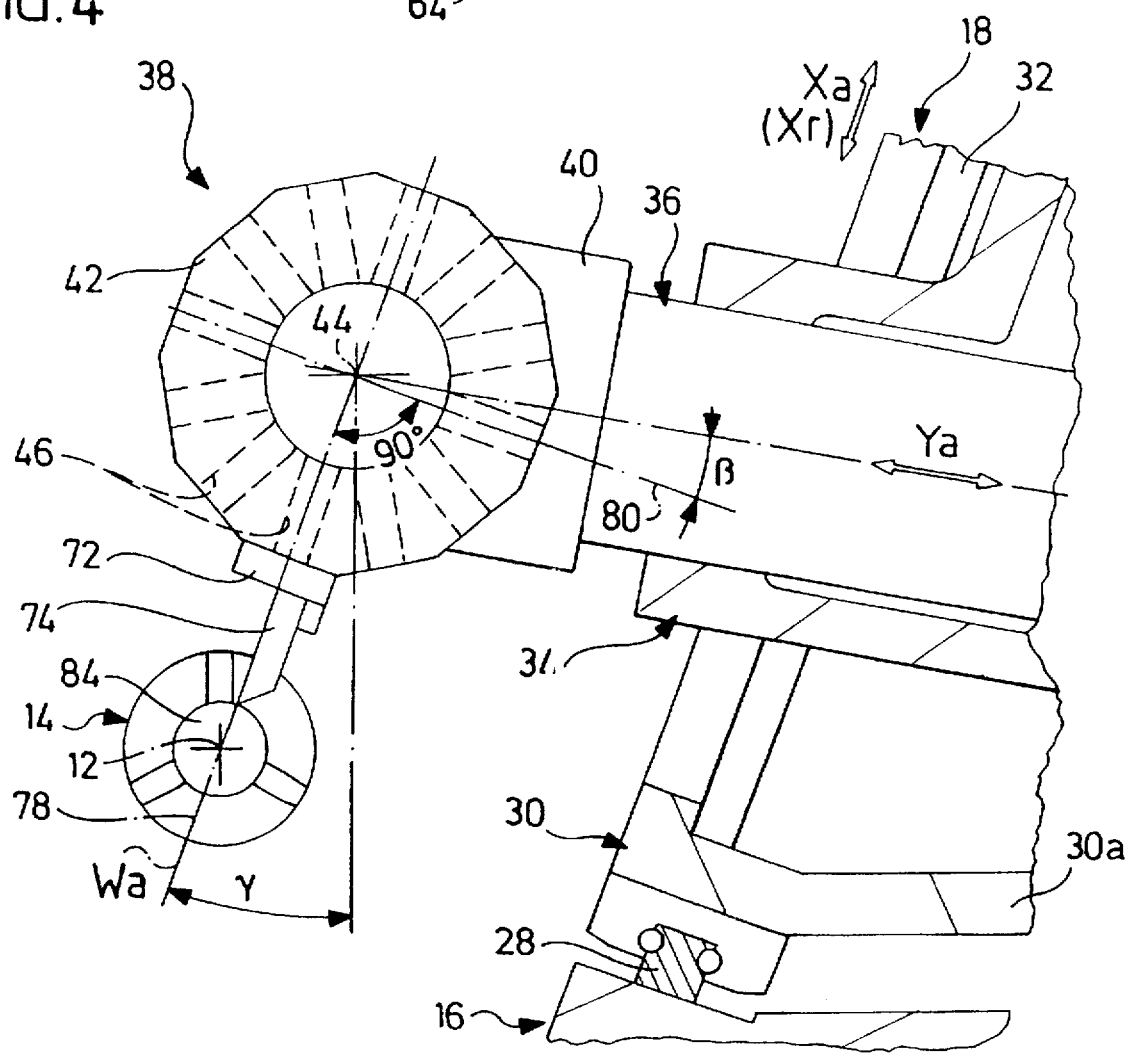
FIG. 4 is a section from FIG. 1 showing the upper tool turret together with parts of the carriage system bearing it and a workpiece held by the workpiece spindle during machining with a lathe tool borne by the tool turret.

An upper tool turret 38 which comprises a turret body 40 (cf. FIG. 2) attached to the Y carriage 36 and a turret head 42 is attached to the end of the Y carriage 36 facing the workpiece spindle axis 12. The turret head 42 may be turned about a turret axis 44 in relation to the turret body 40 but may also be secured on the turret body against any undesired turning in order, on the one hand, to be able to bring any one of the tools held by the turret head 42 into a working position but also to be able to prevent any undesired turning of the turret head during machining. As shown in FIGS. 2–4, the illustrated turret head 42 has twelve tool stations, each of which has a tool receiving means 46 for holding a tool provided with a tool holder.

Figure 5:
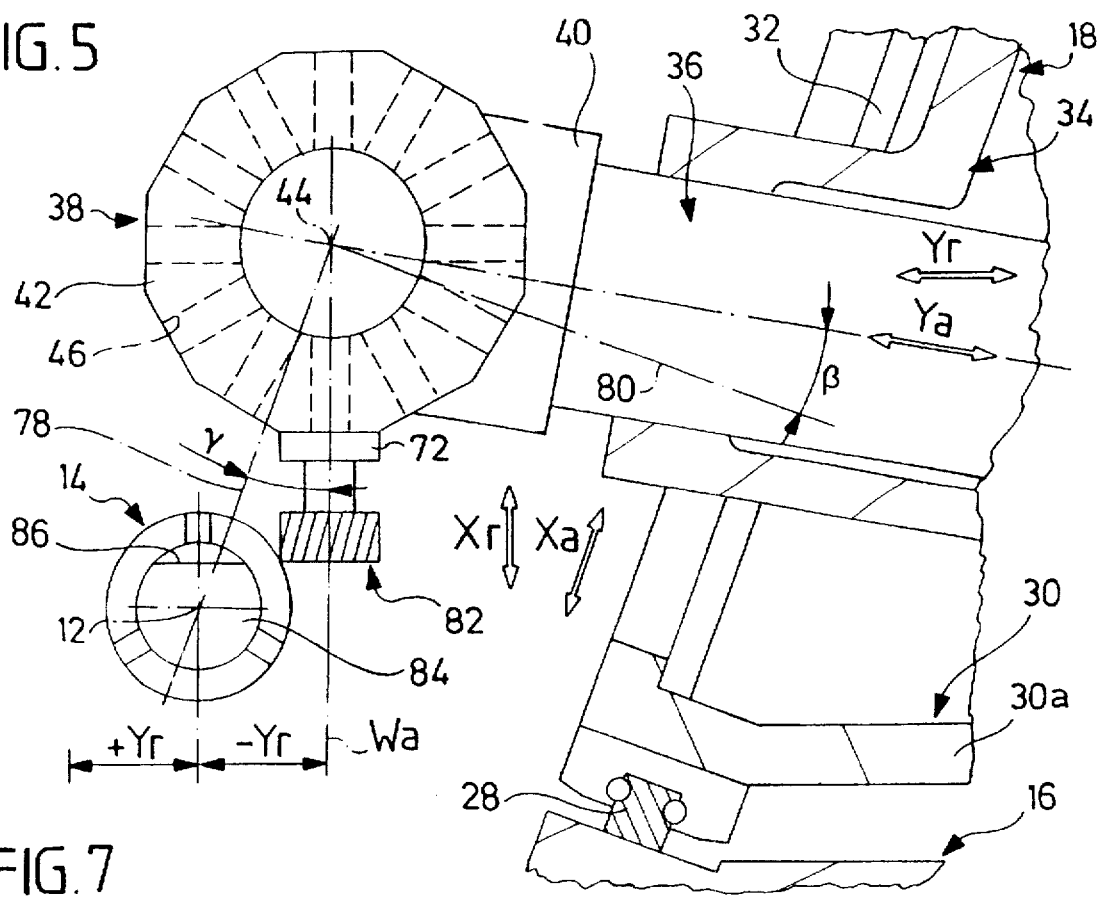
FIG. 5 is an illustration corresponding to FIG. 4 during the machining of a workpiece with a rotatively drivable machining tool in the form of a milling tool.
Figure 7:
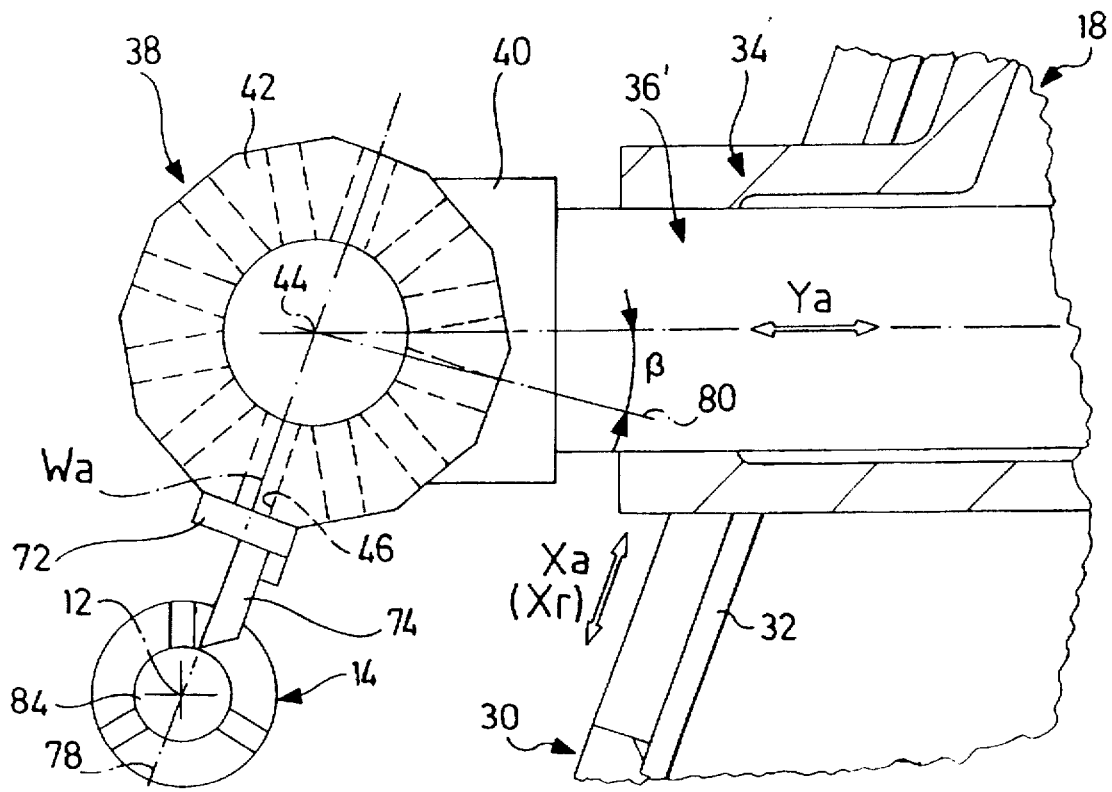
FIG. 7 is an illustration corresponding to FIG. 4 of the second embodiment.

The upper tool turret 38 is, in accordance with the invention, a so-called disk turret, the turret axis 44 of which (where applicable in the starting position of the B-axis, i.e. in the angle of rotation position of the Y carriage 36 illustrated in FIG. 1) extends parallel to the Z-axis or to the workpiece spindle axis 12 and its tool receiving means 46 are oriented such that the axes $W_a$ of the tool receiving means 46, which are indicated in FIGS. 4 and 5 and also define the axes of rotation of driven machining tools, extend radially to the turret axis 44. The axes $W_a$ could, however, also be offset somewhat laterally—according to FIGS. 4 and 5—so that they extend only parallel to the radii but are always oriented at right angles to the turret axis 44.

Drive devices for displacing the Z carriage 30 and the X carriage 34 in the direction of the Z-axis and the $X_a$-axis, respectively, have not been illustrated since they can be conventional assemblies. FIG. 1 does, however, show one drive device for the displacement of the Y carriage 36 in the direction of the $Y_a$-axis which comprises the following components: A motor 50 held by the X carriage and a ball roller spindle 52 which is mounted on the X carriage 34 so as to be rotatable but is held so as to be axially nondisplaceable and the axis of which extends parallel to the $Y_a$-axis, as well as a toothed belt drive 54 between motor 50 and ball roller spindle 52 and an entraining means 56, to which a nut 58 running on the ball roller spindle 52 is attached and which is connected to the Y carriage 36 so that a displacement of the entraining means 56 in the direction of the $Y_a$-axis causes a displacement of the Y carriage in the direction of this axis.

FIG. 3 shows those means, with the aid of which the turret head 42 may be turned about the turret axis 44 in relation to the turret body 40 and secured on the turret body against any undesired turning. Since these means are, however, known they have only been illustrated schematically and will be explained only briefly in the following.

The turret head 42 is provided with an undulatory turret shaft 60, with which it is mounted in the turret body 40 for rotation about the turret axis 44 and is held on the turret body. A locking means 62 is located between the turret head 42 and the turret body 40 and this is a known, two-part HIRTH-type tooth system which allows the turret head to be turned about the turret axis 44 in relation to the turret body 40 and to be locked in a plurality of angle of rotation positions. FIG. 3 shows the turret head 42 in an axial position secured against rotation, and so that the turret head can be turned, it can be displaced to the left according to FIG. 3 in the direction of the turret axis 44 with the aid of a piston 64 of a hydraulic piston-cylinder system; the piston-cylinder system is operative in both directions which has been indicated by the pressure oil connections A and B and so the turret head 42 can also be drawn back into its locked position with the aid of the piston-cylinder system. A motor 66 is attached to the turret body 40 and the turret shaft 60 and, with it, the turret head 42 can be turned about the turret axis 44 due to the motor and a gearing 68 when the locking means 62 is inoperative. Finally, an angle of rotation indicator 70 is attached to the motor 66 and with the aid of this indicator and the machine control which is not illustrated the turret head 42 can be turned into any desired angle of rotation position (this must, of course, be an angle of rotation position, in which the turret head 42 can be secured by the locking means 62 against any undesired turning).

FIG. 4 shows the operation of turning, i.e. the machining of a workpiece with the aid of a lathe tool which is held by the upper tool turret 38. FIG. 4 shows in detail that a tool holder 72 is inserted into one of the tool receiving means 46 of the turret head 42. This tool holder bears a cutting tool 74, the operative machining edge of this cutting tool being located on the axis $W_a$ of the tool receiving means 46 holding this tool. For the workpiece machining by turning, the turret head 42 is adjusted by turning about the turret axis 44 and then locked such that the axis $W_a$ associated with the cutting tool 74 is oriented radially with respect to the workpiece spindle axis 12, as shown in FIG. 4. The tool turret 38 is then moved forwards on the workpiece spindle axis 12 in a radial direction with respect to this spindle axis and/or (after corresponding adjustment of the radial distance workpiece spindle axis—cutting edge of the cutting tool) displaced in the direction of the Z-axis. For this purpose, the X carriage and/or the Z carriage 30 are displaced with the aid of their drive devices which are not illustrated. It should be added that it is, of course, also necessary, where applicable, to position the Y carriage 36 in the direction of the $Y_a$-axis for achieving a radial orientation, with respect to the workpiece spindle axis 12, of the axis $W_a$ associated with the cutting tool 74.

The so-called cutting plane, i.e. that plane, in which the cutting edge of the cutting tool 74 is moved during the turning operation, has been designated as 78 in FIGS. 1 and 4; it is defined by the workpiece spindle axis 12 and the feed direction of the lathe tool operative in the sense of a reduction in the diameter of a workpiece to be machined, i.e. in the automatic lathe illustrated in FIG. 1 by the workpiece spindle axis 12 and the direction of guidance of the linear guide means 32 for the X carriage 34.

Whereas, in conventional automatic lathes, the direction of displacement of the Y carriage extends at right angles to the cutting plane, in the inventive automatic lathe the longitudinal axis of the Y carriage 36, i.e. its direction of displacement ($Y_a$-axis), is inclined in relation to the normal 80 onto the cutting plane 78 through an acute angle $\beta$, namely in accordance with the invention upwards or such that the angle $\beta$ is located on the side of the normal onto the cutting plane 78, which is drawn through the turret axis 44, facing away from the workpiece spindle axis 12 (cf. FIGS. 4 and 5). In the inventive automatic lathe, this results in the axis $W_a$ of the tool receiving means 46 equipped with the lathe tool 74 not extending at right angles to the Y-axis during turning, as in a conventional automatic lathe; rather, this axis $W_a$ forms an oblique angle with the $Y_a$-axis during turning (cf. FIG. 4). Only then does an advancing of the lathe tool in the sense of a reduction in the workpiece diameter require no interpolation in the machine control and a simultaneous displacement of the X carriage as well as the Y carriage, which has been indicated in FIG. 4 by the direction of guidance $X_a$ for the X carriage 34 coinciding with the X-axis defined in the conventional manner (direction $X_r$). In FIG. 4, the angle between the $Y_a$-axis and the tool axis $W_a$ or the cutting plane 78 is therefore (90°+$\beta$).

This inclination of the Y carriage 36 in relation to the normal onto the cutting plane 78 results in the advantage that the base member 30a of the Z carriage 30 can be designed to be approximately wedge-shaped, as can be seen in FIG. 1.

The state of the art discloses tool turrets, the tool receiving means of which can be equipped not only with lathe tools but also with rotatively drivable machining tools, such as, e.g., milling tools and drills. It is not, therefore, necessary to illustrate in the attached drawings or describe how such a rotatively drivable machining tool borne by the turret head 42 is driven, i.e. caused to rotate about its tool axis $W_a$. A tool turret which can be equipped with rotatively drivable machining tools is described and illustrated, for example, in DE-A1-41 25 003 of the company Index-Werke GmbH & Co. KG Hahn & Tessky.

FIG. 5 shows the turret head 42 with a rotatively drivable machining tool 82 inserted into one of its tool receiving means 46. This machining tool is in the form of a milling tool, with which the surface 86, which is shown in FIG. 5 and extends parallel to the workpiece spindle axis 12, is intended to be produced on a workpiece 84 held by the workpiece spindle. For this purpose, the workpiece spindle holding the workpiece 84 is fixed in position, i.e. secured against rotation, and, according to the invention, the turret head 42 is turned about the turret axis 44 oriented parallel to the workpiece spindle axis 12 such that the tool axis $W_a$ of the tool 82 or the tool receiving means 46 of the turret head 42 holding this tool forms with the cutting plane 78 defined for the turning operation an acute angle $\gamma$ which is located on the side of the cutting plane facing the carriage bed 16. In this way, the following is achieved:

As shown in FIG. 5, to produce the surface 86 on the workpiece 84 the tool 82 must be displaced in the direction of a $Y_r$ axis which extends at right angles to the tool axis $W_a$ of the working tool 82 and at right angles to the workpiece spindle axis 12. Proceeding from a plane extending at right angles to the surface 86 to be produced and containing the workpiece spindle axis 12, FIG. 5 shows a situation, according to which the tool 82 is displaced relative to the workpiece 84 in the direction of the $Y_r$ axis over a distance which is composed of the sections $-Y_r$ and $+Y_r$. The movement of the tool 82 out of the cutting plane 78 as far as the right-hand end, according to FIG. 5, of the section $-Y_r$ does not, however, take place due to displacements of the Y carriage 36 but due to swivelling of the tool 82 through the angle $\gamma$. For this reason, FIG. 5 shows a position of the Y carriage 36, from which this carriage need only be displaced to the left according to FIG. 5 in order to produce the surface 86 with the aid of the tool 82 (with, of course, simultaneous displacement of the X carriage 34 downwards in the direction of the $X_a$-axis, the necessary displacement movements of the X carriage and the Y carriage needing to be determined in the machine control by interpolation). A comparison of FIGS. 4 and 5 shows that the Y carriage 36 would have to be able to be drawn back still further to the right out of its right-hand end position illustrated in FIG. 5, if work was intended to be carried out with the tool 82 in the manner previously known, namely in an angle of rotation position of the turret head 42, in which the tool axis $W_a$ of the machining tool 82 is located in the cutting plane 78 defined for a lathe machining, in order to produce a surface on the workpiece 84 which extends at right angles to this cutting plane and parallel to the workpiece spindle axis 12. Since FIG. 5 is, however, intended to illustrate the right-hand end position of the Y carriage 36, in this case the distance of the upper carriage system 18 from the cutting plane 78 would have to be increased which would entail the disadvantages described at the outset. On the other hand, the inventive swivelling of the tool axis $W_a$ of the machining tool 82 out of the cutting plane 78 to the right according to FIG. 5 makes it possible to cover the section $-Y_r$ shown in FIG. 5 by swivelling the turret head 42 instead of by displacing the Y carriage 36 to the right according to FIG. 5.

In FIG. 5, the angle $\gamma$ is larger than the angle $\beta$ or, expressed more generally, the angles $\beta$ and $\gamma$ differ from one another. As a result of this, the feed direction $Y_r$ of the tool 82 differs from the feed direction $Y_a$ during the production of the surface 86. On the other hand, it applies quite generally for the invention that the tool feed direction $X_r$ operative in the sense of a reduction in the workpiece diameter when working with a rotatively drivable tool is not equal to the tool feed direction $X_a$ operative in the sense of a reduction in the diameter of the workpiece when working with a lathe tool.

FIG. 5 also shows that the same applies with respect to the distance $-Y_r$ for producing a bore which does not extend radially with respect to the workpiece spindle axis 12 by means of a drill replacing the milling tool 82 and that the axis of a rotating tool can also be displaced parallely to the side in comparison with the axis $W_a$ for the milling tool 82. It is merely required for such an axis to be oriented at right angles to the turret axis 44.

The second, particularly advantageous embodiment of the inventive automatic lathe will now be described in the following on the basis of FIGS. 6–9, and since the two embodiments according to FIGS. 1–5, on the one hand, and FIGS. 6–9, on the other hand, differ from one another only in the inclination of the feed axis of the Y carriage as well as in the capability of the tool turret 38 to turn about the $Y_a$-axis or about an axis parallel to this, the same reference numerals as in FIGS. 1–5 have been used in FIGS. 6–9 and, consequently, it is unnecessary to describe the construction of the second embodiment, if the differences mentioned above are disregarded.

Figure 8:
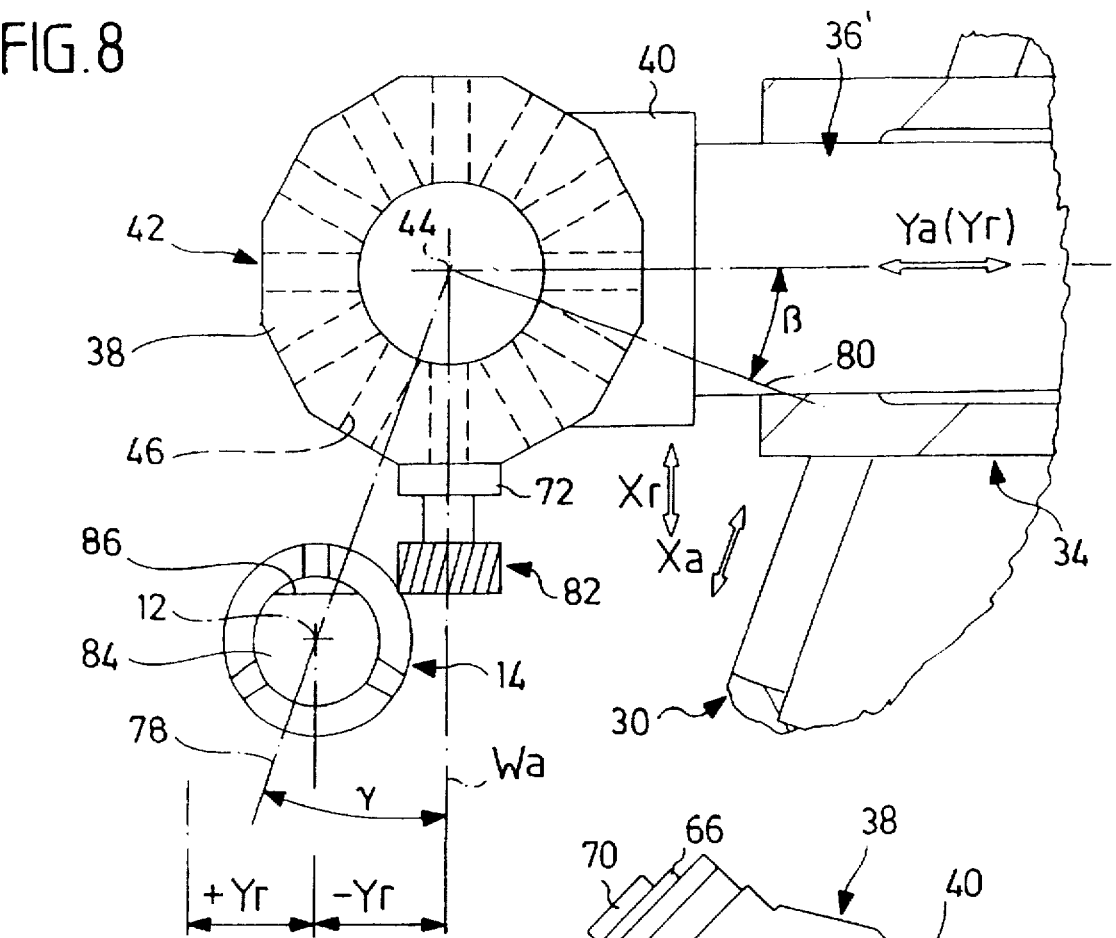
FIG. 8 is an illustration corresponding to FIG. 5 of the second embodiment.

Two different constructions result, however, only when the turret head 42 cannot be fixed in any desired angle of rotation position on the turret body 40, as is the case when using a HIRTH-type tooth system as locking means 62. If it is, namely, possible to fix the turret head 42 in any desired angle of rotation position by means of a different, suitable locking or braking device, the turret head 42 can, since the angle γ can then be freely selected, be positioned with respect to its angle of rotation and then secured in position for working with a rotatively drivable machining tool such that the tool axis $W_a$ of the machining tool 82 forms a right angle with the feed axis $Y_a$ of the Y carriage 36, as illustrated in FIG. 8. As shown by this Figure, the surface 86 can then be produced on the workpiece 84 with the aid of the machining tool 82 designed as a milling tool by merely displacing the Y carriage 36 in the direction of the $Y_a$-axis.

With the construction illustrated in FIG. 8, the feed directions operative in the sense of a reduction in the workpiece diameter, namely $X_a$ for the turning (cf. FIG. 7) and $X_r$ for the work done with a rotating tool, such as the tool 82, again do not coincide whereas, as already mentioned, e.g. during milling of a surface, the actual feed direction $Y_r$ of the rotating tool transversely (which is not to be equated with at right angles) to the cutting plane defined for the turning coincides with the guide and feed direction $Y_a$ of the Y carriage 36.

The provision of the inventive automatic lathe with a B-axis gains significance only for embodiments, in which the angles β and γ are of the same size; this is the case in the second embodiment according to FIGS. 6–9 but also in a variation of the first embodiment according to FIGS. 1–5, in which the turret head 42 can also be fixed in an angle of rotation position, in which the tool axis $W_a$ of a rotatively drivable machining tool extends at right angles to the feed axis $Y_a$ of the Y carriage 36.

Figure 6:
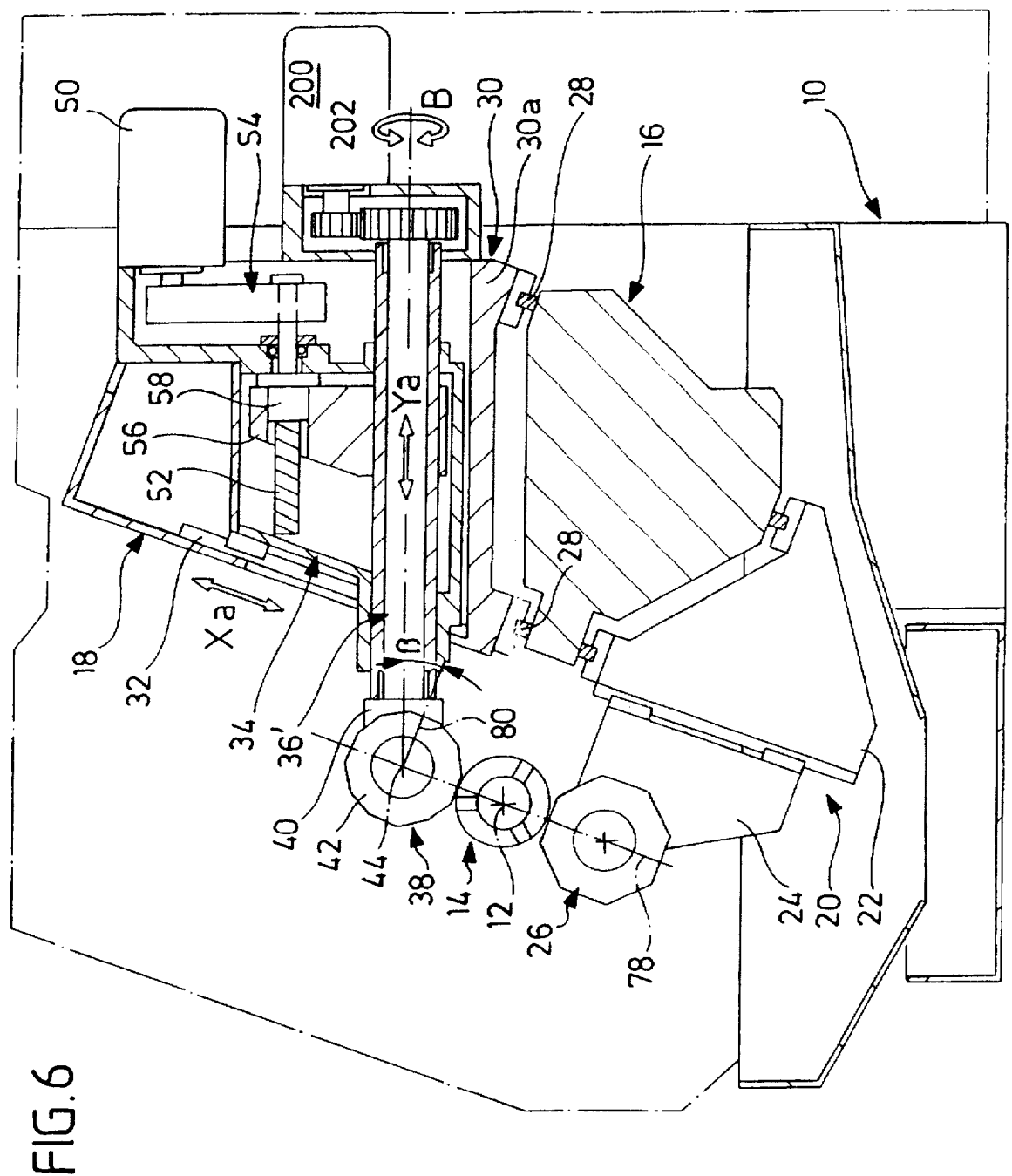
FIG. 6 is an illustration corresponding to FIG. 1 of the second embodiment.

As shown in FIG. 6, a B-axis has been realized in the second embodiment by a B-axis shaft 36', which bears the tool turret 38, being mounted in the Y carriage so as to be rotatable about the $Y_a$-axis but axially non-displaceable. A B-axis drive for rotating the B-axis shaft 36' comprises a motor 200 attached to the X carriage 34 and a toothed-wheel gearing 202. The axis of rotation (B-axis) of the tool turret 38 could, however, also be merely parallel to the $Y_a$-axis drawn in FIG. 6.

Figure 9:
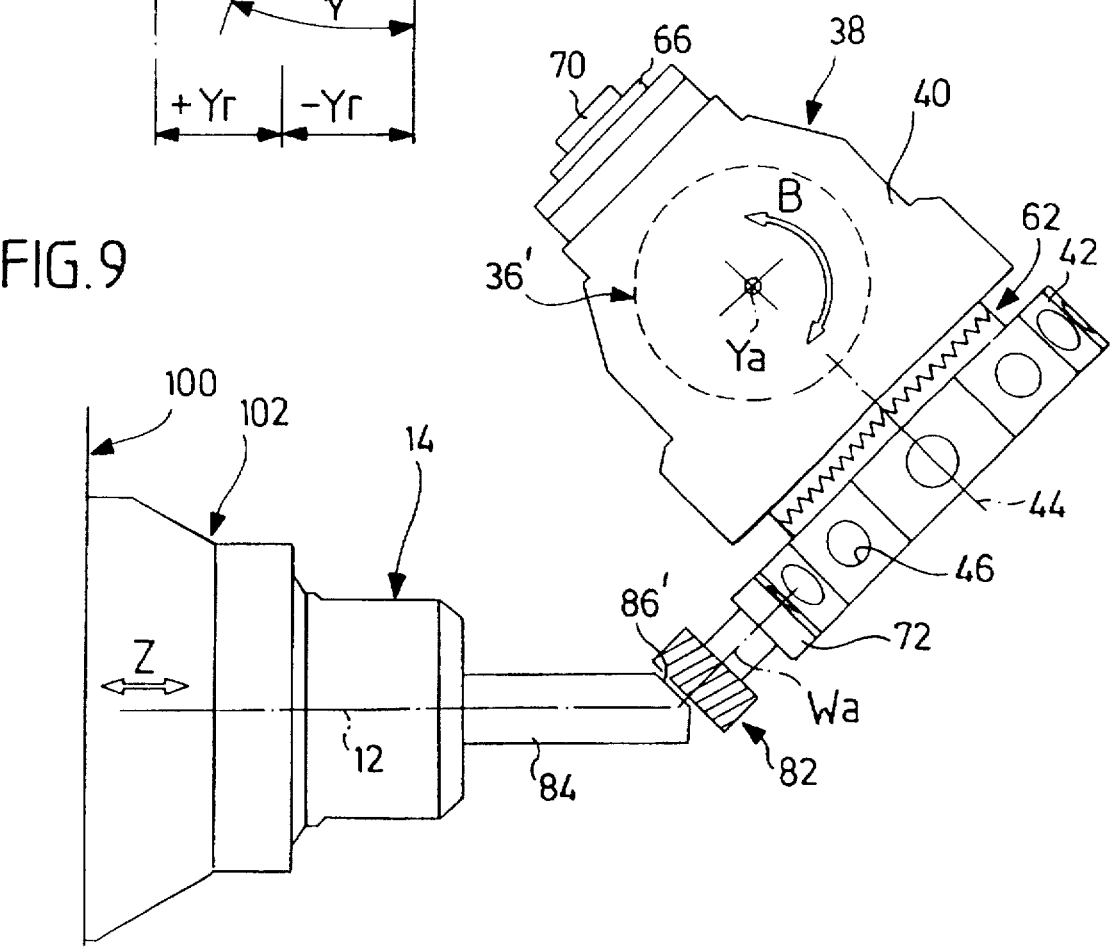
FIG. 9 shows the front part of the workpiece spindle with a workpiece held thereby as well as the tool turret of the second embodiment during milling of an inclined surface, namely seen in the direction of the right-hand arrow $Y_a$ from FIG. 6.

By using the B-axis, which enables the tool axis $W_a$ of a rotatively drivable machining tool to be swivelled out of the plane extending at right angles to the workpiece spindle axis 12 due to turning the B-axis shaft 36' about its longitudinal axis, bores, surfaces and the like which are inclined in relation to the workpiece or workpiece spindle axis can then be produced with rotatively drivable machining tools, which is intended to be explained by means of FIG. 9 which illustrates the milling of such an inclined workpiece surface 86'. As already mentioned, FIG. 9 indicates a headstock 100, in which a workpiece spindle 102 is mounted so as to be rotatable and rotatively drivable about the workpiece spindle axis 12 and the front end of this workpiece spindle, i.e. that end facing the working space of the automatic lathe, bears the chuck 14, in which the workpiece 84 to be machined is clamped.

It is clear from the above that the angle γ is the angle between the cutting plane 78 of an operating lathe tool and the tool axis $W_a$ of an operating rotating tool (in the basic position of the B-axis measured in a plane extending at right angles to the turret axis 44) and that the angle γ need in no way be identical to the angular distance between the axes $W_a$ of the tool receiving means 46 of two adjacent tools held by the turret head 42. If a locking means 62 is used for the turret head 42, which allows only a predetermined angle of rotation distance between adjacent angle of rotation positions of the turret head 42, in which this can be secured against rotation, the angle γ must, however, be an integral multiple of this angle of rotation distance.

It should have become clear from the above explanation of the invention that when, with regard to the definition of the invention, it is stated that a rotatively drivable machining tool located in a working position is swivelled with its axis of rotation out of the cutting plane, this working position is not to be understood as that angle of rotation position of the tool axis which the tool axis takes up during the operation of the rotating tool but, rather, that angle of rotation position of the tool axis or the axis of an associated tool receiving means of the turret head which the axis of a lathe tool would take up during operation. This becomes clear when it is borne in mind that during the transition from one tool to another tool which is borne by the tool turret and has previously been used or will be subsequently used, the machine control basically indexes the turret head first of all through an angle of rotation which corresponds to the angle of rotation distance between two adjacent tool receiving means of the turret head or an integral multiple of this angle of rotation distance, whereupon the inventive swivelling of the axis of rotation of a rotatively drivable machining tool out of the cutting plane takes place.

Furthermore, the term "tool turret" used in the claims is to be understood only as the component of a tool carrier which is rotatable about the turret axis and bears the tools, i.e. the turret head 42 in the embodiments illustrated in the drawings.

Drive devices for the workpiece spindle of an automatic lathe which provide the workpiece spindle with a C-axis are known and so it would not be necessary as such to illustrate such a workpiece spindle drive in the drawings and describe it. Devices, with which the workpiece spindle can be secured against rotation in any desired angle of rotation position, are likewise known.

With respect to the drive means for rotatively drivable tools held by a tool turret, a C-axis drive for a workpiece spindle and a B-axis drive for a Y carriage of an automatic lathe bearing a tool turret, reference is made for the sake of completeness to the state of the art according to EP-A1-0 538 515 of the company Index-Werke & Co. KG Hahn & Tessky.

Figure 10:
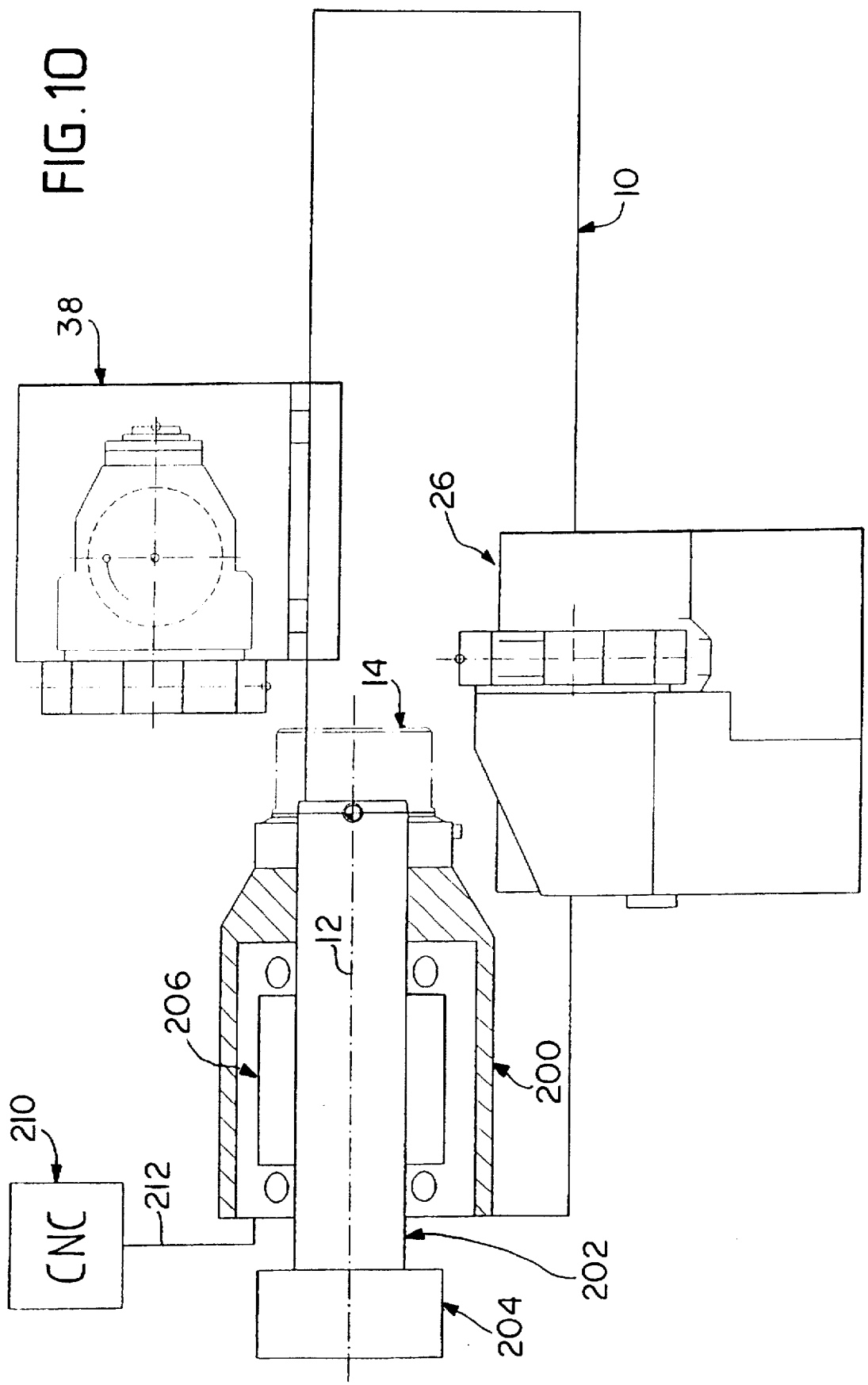
FIG. 10 is a considerably simplified and schematic illustration of part of the automatic lathe according to FIG. 1 to show its headstock as well as to illustrate the C-axis of this automatic lathe.

FIG. 10 shows schematically the machine base 10 of the automatic lathe according to FIG. 1, with only a part of this machine base having been shown. A headstock 200 is attached to this and a workpiece spindle 202 rotatable about the workpiece spindle axis 12 is mounted in this headstock so as to be axially non-displaceable. The front, right end, according to FIG. 10, of the workpiece spindle 202 bears the chuck 14 for holding a workpiece to be machined, and at the left end of the workpiece spindle 202 FIG. 10 indicates a so-called cocking cylinder 204, with which the chuck 14 is actuated in the customary and known manner in order to clamp a workpiece and release it again after the machining. The workpiece spindle 202 is intended to be designed as a so-called motor spindle; with such motor spindles, the workpiece spindle forms a unit together with a drive motor 206, the drive motor is accommodated in the headstock 200 and surrounds the workpiece spindle concentrically to the workpiece spindle axis 12. Since such drive motors are known, they do not require any more detailed illustration or description, and it is merely pointed out that such drive motors have a concentric arrangement consisting of an outer stator and an inner rotor, the latter being non-rotatably connected to the workpiece spindle 202.

Furthermore, the lower tool turret 26 and the upper tool turret 38 are also illustrated in FIG. 10.

Finally, FIG. 10 schematically shows a computerized numerical control 210 of the automatic lathe according to FIG. 1, which is connected, inter alia, to the drive motor 206 via a control line 212 and makes it possible in a known manner for the drive motor 206 not only to drive the workpiece spindle 202 for a normal lathe machining by means of a non-rotating lathe tool but also to stop and secure the workpiece spindle in any desired angle of rotation position as well as to drive it with a low angular velocity in a controlled manner with respect to the angle of rotation (operation of the workpiece spindle with a so-called C-axis).

Figure 11:
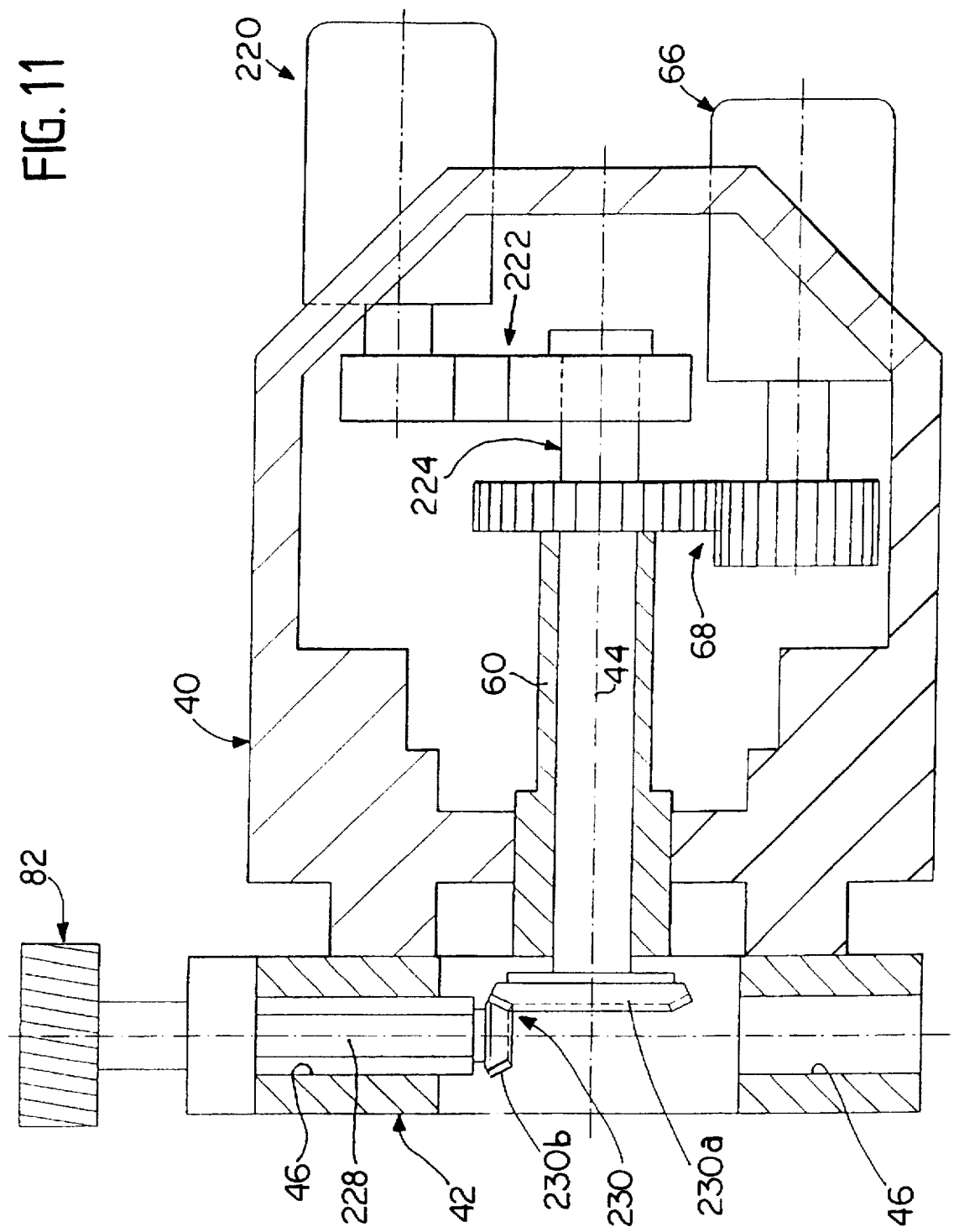
FIG. 11 shows a likewise considerably simplified and schematic section through a tool turret as it can be used in the inventive automatic lathe, namely to illustrate a drive device, with which a rotatively drivable machining tool held by this tool turret can be driven.

FIG. 11 shows, first of all, the parts of the upper tool turret 38 illustrated in FIG. 3 (the locking means 62 has, however, been omitted for the sake of simplicity) and so in this respect no description of FIG. 11 is required. However, the latter shows, in addition, a tool drive motor 220 which is attached to the turret body 40 and can drive via a gearing 222 a central tool drive shaft 224 which is concentric to the turret axis 44 and is mounted in the turret shaft 60 so as to be rotatable but axially non-displaceable.

As illustrated in FIG. 5 (which is to be considered in conjunction with FIG. 3), FIG. 11 also shows a rotatively drivable machining tool 82 which is inserted into one of the tool receiving means 46 of the turret head 42 and is designed as a milling tool. This machining tool has a tool shaft 228 which can be driven by the central tool drive shaft 224 via a bevel gearing 230; for this purpose, a first bevel gear 230a is attached to the left end, according to FIG. 11, of the drive shaft 224 and this meshes with a bevel gear 230b attached to the inner end of the tool shaft 228 when the machining tool 82 is inserted into the turret head 42.

We claim:

1. Method for machining a workpiece by a rotatively driven tool on a CNC automatic lathe, said lathe having
    a headstock,
    a workpiece spindle for holding said workpiece, said workpiece spindle being mounted in the headstock for rotation about a workpiece spindle axis, said workpiece spindle axis defining the direction of a Z-axis,
    a workpiece spindle drive for rotating the workpiece spindle and for preventing rotation of said spindle,
    a stationary carriage bed,
    at least one tool carrier carriage system being held on said bed, said system comprising a carriage being movable in directions deviating from the direction of said Z-axis,
    a tool carrier in the form of a tool turret mounted on said carriage for being turned in a controlled manner about a turret axis parallel to said Z-axis and for being secured in a plurality of angle of rotation positions, said turret having a plurality of tool stations for carrying tools such as a turning tool for carrying out a turning operation on a workpiece held by the workpiece spindle, at least one of said tool stations being equippable with a tool rotatively drivable about a tool axis oriented at right angles to said turret axis,
    wherein said workpiece spindle and said turret are movable relative to one another in the direction of the Z-axis,
    and wherein, when said turning tool is in a working position for reducing an external diameter of a workpiece held by the rotating workpiece spindle, said turret axis and said workpiece spindle axis defining a cutting plane which contains the turret axis and the workpiece spindle axis,
    said method comprising the steps of:
        (a) turning the tool turret about the turret axis into a predetermined angle of rotation position such that said tool axis of said rotatively drivable tool facing said workpiece forms an acute angle with a reference plane parallel to said cutting plane and containing said turret axis, said acute angle being located on the side of said reference plane facing said bed;
        (b) rotating said rotatively drivable tool about said tool axis; and
        (c) moving the tool turret in a feed direction deviating from the direction of the Z-axis while maintaining said predetermined angle of rotation position of the turret and while acting on said workpiece with said rotating drivable tool.

2. The method of claim 1, wherein the turret is turned about the turret axis such that said tool axis extends at right angles to a Y-axis defining the direction in which said carriage is movable, whereupon the turret is moved in said direction or at right angles thereto while acting on said workpiece with said rotating drivable tool.

3. A CNC automatic lathe having
    a CNC control device,
    a headstock,
    a workpiece spindle for holding a workpiece to be machined, said workpiece spindle being mounted in the headstock for rotation about a workpiece spindle axis, said workpiece spindle axis defining the direction of a Z-axis,
    a workpiece spindle drive for rotating the workpiece spindle and for preventing rotation of said spindle,
    a stationary carriage bed,
    at least one tool carrier carriage system being held on said bed, said system comprising a carriage being movable in directions deviating from the direction of said Z-axis,
    a tool carrier in the form of a tool turret mounted on said carriage for being turned in a controlled manner about a turret axis parallel to said Z-axis and for being secured in a plurality of angle of rotation positions, said turret having a plurality of tool stations for carrying tools such as a turning tool for carrying out a turning operation on a workpiece held by the workpiece spindle, at least one of said tool stations being equippable with a tool rotatively drivable about a tool axis oriented at right angles to said turret axis, said workpiece spindle and said turret being movable relative to one another in the direction of the Z-axis, said turrret axis and said workpiece spindle axis defining a cutting plane containing the turret axis and the workpiece spindle axis when said turning tool is in a working position for reducing an external diameter of a workpiece held by the rotating workpiece spindle, wherein (a) said carriage is movable at least in the direction of a Y-axis forming an angle with said cutting plane;

(b) the direction of said Y-axis intersecting the turret axis forms a first acute angle with a normal through the turret axis onto said cutting plane, said first acute angle being located on a side of said normal facing away from the workpiece spindle axis and not exceeding 45 degrees; and wherein (c) the tool axis of said rotatively drivable tool forms a second acute angle with said cutting plane when said rotatively drivable tool carries out a machining operation including at least a phase in which said tool axis does not intersect the workpiece spindle axis, said second acute angle being located (i) on a side of said normal facing said bed and (ii) on a side of the cutting plane facing said bed.

4. The lathe of claim 3, wherein said first acute angle is 10 degrees to 30 degrees.

5. The lathe of claim 3, wherein said first acute angle is smaller than the angle of rotation distance between two adjacent tool stations.

6. The lathe of claim 5, wherein said first acute angle is approximately ⅔ of said angle of rotation distance.

7. The lathe of claim 3, wherein said first acute angle and said second acute angle are of equal size.

8. The lathe of claim 3, wherein said carriage system has a bed carriage guided on said bed for movement in the direction of the Z-axis, said bed carriage having an approximately wedge-shaped body when seen in the direction of the Z-axis.

9. The lathe of claim 3, wherein the carriage holding the turret is a spindle sleeve guided within said carriage system for movement in the direction of said Y-axis.

10. The lathe of claim 9, having a spindle sleeve drive for a controlled rotation of the spindle sleeve about an axis parallel to said Y-axis.

11. The lathe of claim 8, wherein said carriage system has an intermediate carriage guided on said bed carriage for movement in the direction of an X-axis being parallel to said cutting plane and perpendicular to said Z-axis, and wherein the carriage holding the turret is guided on said intermediate carriage for movement in the direction of said Y-axis.

12. The lathe of claim 3, wherein said CNC control device and said workpiece spindle drive provide for a controlled rotation of the workpiece spindle with a rotational speed substantially lower than the rotational speed necessary for machining a workpiece by said turning tool.

* * * * *

UNITED STATES PATENT AND TRADEMARK OFFICE
CERTIFICATE OF CORRECTION

PATENT NO. : 5,765,456  
DATED : June 16, 1998  
INVENTOR(S) : Walter Grossman

Page 1 of 1

It is certified that error appears in the above-identified patent and that said Letters Patent is hereby corrected as shown below:

Title page,
Item [73] Assignee, after "Co." insert -- KG --.

Signed and Sealed this

Fourth Day of December, 2001

Attest:

*Nicholas P. Godici*

NICHOLAS P. GODICI  
*Attesting Officer*     *Acting Director of the United States Patent and Trademark Office*